(12) United States Patent
Saudemont et al.

(10) Patent No.: US 6,534,433 B1
(45) Date of Patent: Mar. 18, 2003

(54) PROCESS FOR PREPARING A CATALYST SUPPORT FOR POLYMERIZATION OF ALPHA-OLEFINS, AND SUPPORT THUS OBTAINED

(75) Inventors: Thierry Saudemont, Jurancon (FR); Jean Malinge, Loubieng (FR); Jean-Loup LaCombe, Artiguelouve (FR); Daniel Cochard, Argagnon (FR); Henri Violle, Baigts de Bearn (FR)

(73) Assignee: Atofina, Puteaux (FR)

( * ) Notice: Subject to any disclaimer, the term of this patent is extended or adjusted under 35 U.S.C. 154(b) by 29 days.

(21) Appl. No.: 09/628,685

(22) Filed: Jul. 28, 2000

(30) Foreign Application Priority Data

Jul. 28, 1999 (FR) .............................. 99 09796
Aug. 4, 1999 (FR) ............................ 99 10129

(51) Int. Cl.$^7$ .............................. B01J 31/02; B01J 31/32
(52) U.S. Cl. ....................... 502/128; 502/104; 502/103; 502/115; 502/125; 502/126; 526/209; 526/124.3; 526/158; 526/142; 526/137
(58) Field of Search ................................ 502/104, 103, 502/115, 125, 126, 128; 526/209, 124.3, 158, 142, 137

(56) References Cited

U.S. PATENT DOCUMENTS 5,055,535 A * 10/1991 Spitz et al. ................. 526/142

FOREIGN PATENT DOCUMENTS

| EP | 0 239 475 | 10/1987 |
| EP | 0 554 141 | 8/1993 |

* cited by examiner

*Primary Examiner*—Helen L. Pezzuto
*Assistant Examiner*—Ling-Siu Choi
(74) *Attorney, Agent, or Firm*—Smith, Gambrell & Russell, LLP

(57) ABSTRACT

A process is provided for preparing a catalyst support for polymerizing α-olefins comprising the steps of: (i) reacting, in the presence of a first electron donor, a chlorine-containing organic compound and a prior mixture of an alkylmagnesien and an aluminoxane and/or aluminosiloxane and/or alkylaluminum and, optionally, a second electron donor; and (ii) activating a product from step (i) in suspension in an inert liquid by means of an activation electron donor, together with the support thus obtained, a catalyst for polymerizing α-olefins, comprising this catalyst support and a group IV transition metal halide, and a process for polymerizing α-olefins, particularly propylene, comprising contacting the α-olefin with the catalyst.

22 Claims, No Drawings

PROCESS FOR PREPARING A CATALYST SUPPORT FOR POLYMERIZATION OF ALPHA-OLEFINS, AND SUPPORT THUS OBTAINED

FIELD OF THE INVENTION

The present invention relates to a process for preparing a catalyst support for (stereospecific) polymerization of alpha-olefins, in particular propylene, and to the support thus obtained.

BACKGROUND OF THE INVENTION

Alpha-olefin polymerization in general is carried out using Ziegler-Natta type catalysts. The Ziegler-Natta type catalyst system is generally constituted by two non-dissociable elements: a transition metal-based catalytic component deposited on a magnesium chloride-based support and a co-catalyst generally based on an aluminum compound. Numerous patents describe these catalyst components and their supports.

European patent application EP-A-0,239,475 discloses a controlled morphology catalyst spherical support for alpha-olefin polymerization. The catalyst support is obtained by reacting a chlorine-containing organic compound in the presence of an electron donor and a prior mixture of an alkylmagnesien and an aluminoxane and/or aluminosiloxane and, optionally, an electron donor. The support is then subjected to an activation step using a chlorine-containing compound prior to impregnation by a transition metal halide. This process leads to effective catalysts for ethylene polymerization. They have however proved to be less effective in particular for polymerization of propylene.

Activation of catalyst supports by treatment with cyclic monoethers for ethylene polymerization catalysts is known. European patent application 0,554,141 discloses, for example, a process for activating a magnesium chloride-based support that enters into the manufacture of the ethylene catalytic polymerization component. This process comprises activating the support in suspension in an inert liquid using a cyclic mono-ether. That patent does nevertheless not disclose nor suggest the possibility of such activation for controlled morphology catalyst supports adapted to propylene polymerization.

U.S. Pat. No. 3,642,746 discloses a Ziegler-Natta catalyst system useful to reduce the ash content of the obtained polymer. The catalyst is prepared by pretreatment of a divalent metal dihalide with en electron donor and impregnation of the obtained support with a transition metal halide.

A process for polymerization of ethylene in the gas phase leading to a linear polyethylene with a narrow weight distribution is known from U.S. Pat. No. 5,055,535. This process uses a Ziegler-Natta catalyst in presence of an alkylaluminium and a monoether. According to this document, the monoether should not be in contact with the catalyst in absence of the cocatalyst in the medium. The monoether constitues therefore an external Lewis Base and intervenes only during the polymerization. Further the monoether does not act as a polymerization activator and does therefore not allow to enhance productivity.

It is known that stereospecific polymerization of α-olefins beyond ethylene such as propylene requires a stereospecific type catalyst. Indeed, contrary to polymerization of ethylene, which is a symmetrical molecule, the polymerization of an asymmetric α-olefin, such as propylene, can lead to isotactic, syndiotactic or atactic chaining. The use of a stereospecific catalyst can then ensure that polymers of the desired structure, such as predominantly syndiotactic or isotactic, for example, are obtained. This explains why catalysts employed for ethylene polymerization are not necessarily suitable for polymerizing polypropylene.

SUMMARY OF THE INVENTION

It has now been surprisingly found that activation adapted to ethylene can be applied to a support adapted to propylene.

The invention makes it possible to obtain catalysts which are both highly effective and highly stereospecific for the polymerization of α-olefins with at least 3 carbon atoms, in particular propylene.

The invention consequently provides a process for preparing a catalyst support for polymerizing α-olefins comprising the steps of:

(i) reacting, in the presence of a first electron donor, a chlorine-containing organic compound and a prior mixture of an alkylmagnesien and an aluminoxane and/or aluminosiloxane and/or alkylaluminum and, optionally, a second electron donor; and (ii) activating the product from step (i) in suspension in an inert liquid by means of an activation electron donor.

The invention also provides a catalyst support obtainable by the process according to the invention.

DETAILED DESCRIPTION OF THE INVENTION

The invention will now be described in more detail below.

According to the invention, the spherical catalyst support is prepared by reacting, in the presence of an electron donor, a chlorine-containing organic compound with a prior mixture of an alkylmagnesien and an organic compound of aluminium, aluminoxane and/or aluminosiloxane and/or alkyl-aluminum. The chlorine containing organic compound is caused to react in the prior mixture of alkylmagnesien and organic compound of aluminium, the reaction taking place in the presence of a first electron donor. The prior mixture of alkyl magnesien and organic compound of aluminium can also comprise a second electron donor, which, generally, (but not necessarily) is of the same type as the first electron donor.

The reaction is carried out in the presence of a donor, which can be introduced:

through previous mixing of the chlorine-containing organic compound with this (first) donor, or through previous mixing of the alkylmagnesien and aluminium organic compound (aluminoxane and/or aluminosiloxane and/or alkylaluminum) in this (first) donor; or both through previous mixing of the chlorine-containing organic compound in this (first) donor and previous mixing of the alkylmagnesien and organic compound of aluminium (aluminoxane and/or aluminosiloxane and/or alkylaluminum) in this (second) donor. In this case, the second donor can be identical to or different from the first donor; it is preferably identical.

According to one embodiment, the chlorine-containing organic compound is mixed with at least a portion of the first electron donor prior to the reaction of step (i), this portion being preferably at least 50%.

According to one embodiment, the amount of first electron donor mixed with the chlorine-containing organic compound prior to the reaction of step (i) represents, in moles, more than 50% of the total of the first and second electron donors present during the reaction of step (i).

In a further embodiment, the reaction of step (i) takes place in the presence of a first electron donor, the prior mixture of an alkylmagnesien and an aluminoxane and/or aluminosiloxane and/or alkylaluminum comprising a second electron donor, identical to the first electron donor.

At the end of step (i), the solid obtained is generally substantially spherical.

The alkylmagnesien is previously mixed with the aluminoxane and/or aluminosiloxane and/alkylaluminium, preferably in solution in an inert solvent such as a hydrocarbon, for example hexane or heptane, preferably in the presence of an electron donor, which can be the first or second donor depending on the case. Once the mixture has been made, the chlorine-containing organic compound, generally (but not necessarily) diluted in a (first) electron donor and optionally in an inert solvent such as hydrocarbon like hexane or heptane is made to react. At the end of the reaction, the support formed, in suspension in the reaction medium, is filtered and optionally washed with inert liquid. The support, in suspension in an inert solvent such as a hydrocarbon like hexane or heptane, is then brought into contact with a so-called activation electron donor, preferably a cyclic ether. This activation operation can be carried out before or after the preceding filtration and washing operations. The support formed is filtered and optionally washed with an inert liquid if the cyclic ether treatment took place after the first filtration and first washing operations. One thus obtains a support the particle diameter of which is generally comprised between 5 and 150 microns and more generally between 10 and 100. The supports and, consequently the subsequent catalysts have a very narrow granulometric distribution width, in general less than 5. The granulometric distribution width of the final polymers is also narrow given that the polymerization process generally does not generate fines, in other words does not damage the growing particle during polymerization. This granulometric distribution width is characterized by span measurement where the span is equal to (D90–D10)/D50 wherein D90, D10 and D50 represent the diameter below which respectively 90%, 10% and 50% by weight of the particles is respectively found. The final polymers generally have a span value less than 5 preferably less than 2.

The alkylmagnesien implemented corresponds to the formula R1MgR2 wherein R1 and R2 are alkyl radicals having 1 to 12 carbon atoms.

The aluminoxane which may enter into the composition of the support is selected from products having the formula:

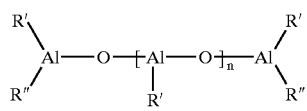

wherein R' is an alkyl radical having 1 to 16 carbon atoms, the R"s forming together an O-radical or each representing an R' radical and n is an integer from 0 to 20.

The aluminosiloxane which may enter into the composition of the support is selected from products having the formula:

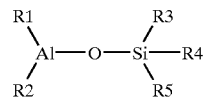

wherein R1, R2, R3, R4, R5 which may be identical or different, represent an alkyl radical having 1 to 12 carbon atoms, preferably 1 to 6 carbon atoms or yet again a hydrogen atom, preferably under the proviso that there are not more than three hydrogen atoms per mole of derivative, or finally a chlorine atom, preferably under the proviso that there are not more than three chlorine atoms per mole of derivative.

The alkylaluminium which may enter into the support composition is selected from products having the formula AlR1R2R3 wherein the groups R1, R2 and R3 have the same definition as above.

The chlorine-containing organic compound, acting as a chlorinating agent for the alkylmagnesien derivative and aluminum organic compound is selected from alkyl chlorides wherein the alkyl radical is primary, secondary or tertiary and optionally comprises a heteroatom, said radical comprising up to 12 carbon atoms, preferably up to 7 carbon atoms among the alkyl polyhalides or among the acid chlorides. Preferred compounds are tertiobutyle chloride, n-butyl chloride, dichloroethane, thionyl chloride, benzoyl chloride.

The reaction is carried out in the presence of a first electron donor and optionally a second donor introduced by the prior mixing of an alkylmagnesien and an aluminum organic compound.

These first and second electron donors that may be identical or different can be selected from the aliphatic or cyclic monoethers and aliphatic or cyclic diethers, aromatic or aliphatic carboxylic acids and their alkyl esters, ketones, vinyl esters, acrylic derivatives, in particular alkyl acrylate or methacrylate, and the silanes. The esters can also be employed in the form of addition products with Lewis acid halides different from the dihalides of magnesium. Particularly suited as first and second electron donors are compounds such as methyl paratoluate, ethyl benzoate, ethyl acetate or butyl acetate, ethylether, ethyl para-anisate, dibutylphtalate, dioctylphtalate, diisobutylphtalate, acetone, methylisobuthylketone, vinyl acetate, methyl methacrylate, phenyltriethoxysilane, cyclohexylmethyl-dimethoxysilane, dicyclopentyldimethoxysilane, 2,2-diisobutyl-1,3-dimethoxypropane, 2,2-diisobutyl-1,3-diethoxypropane, 2-isopropyl-2-isobutyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 9,9-bis(methoxymethyl)fluorene, diisoamylether, sec-butylether, tetrahydrofuranne and dioxane. It is also possible to employ any mixture of the above compounds.

The first and second electron donors are preferably aliphatic or cyclic ethers, notably diusoamylic ether, sec-butylether or tetrahydrofuranne. Particularly preferred are the aliphatic ethers.

In order to excercise strict control of the morphology of the final support, it is preferred to associate the components with each other in appropriate amounts. Thus, the Mg/Al molar ratio is comprised between 5 and 200, preferably between 10 and 80. Chlorine-containing organic compound concentration is such that the Cl/Mg molar ratio is preferably above 2, advantageously it is comprised between 2 and 4. The amount of second electron donor to be implemented with the alkylmagnesien derivative and the aluminum organic compound is such that the molar ratio of the second electron donor to the magnesium is comprised, preferably, between 0.01 and 5. The amount of first electron donor to be implemented with the chlorine-containing agent is such that the molar ratio of this first electron donor to magnesium is comprised, preferably, between 0.01 and 5.

In the framework of this invention, the support such as described above is treated, in suspension in an inert solvent, by an activating electron donor. The molar ratio between activation electron donor and magnesium initially introduced is generally comprised between 0.1 and 3. To avoid any deterioration of the magnesium chloride-based support, it is desirable for the activation electron donor to be highly diluted in the inert liquid. The volume ratio between the inert liquid and activation donor is generally comprised between 1 and 20, preferably between 1 and 10. This treatment can be done with stirring at a temperature comprised between 20° C. and (Teb+20° C.). Teb being the boiling point of the activation electron donor. Preferably., this temperature is comprised between 20° C. and (Teb–10° C.). In this range of preferred temperatures, the support and catalyst are more solid and less fines (with span elevation) are produced during polymerization. The activation electron donor is preferably a cyclic ether selected from the monoethers the oxygen of which forms a cycle having at least 4 and at the most 12 carbon atoms. It is not excluded for some of the carbon atoms of the cycle to be bound to substituant hydrocarbon radicals, the total number of carbon atoms of the cyclic ether not exceeding, in this case, 16. Among these ethers, the following can be cited: tetrahydrofuranne, tetrahydropyrane, 2-methyl-tetrahydrofuranne, 3-methyl-tetrahydropyranne; tetrahydrofuranne being preferred.

The supports according to the invention are particularly suitable for producing Ziegler-Natta catalysts for olefin polymerization, based on halides of group IV transition metal such as titanium.

The support is for example impregnated with transition metal halide, more particularly of formula $Ti(OR)_nX_{4-n}$ where R is an alkyl radical with 1–12 carbon atoms, X is a halogen and n is an integer comprised between 0 and 4, preferably $TiCl_4$. Impregnation can be done conventionally by adding a sufficient amount of transition metal halide to the support, optionally in an inert solvent to form a homogeneous suspension. Such impregnation can be done in the presence of an electron donor. The support can optionally undergo two or more successive impregnations with the compound of general formula $Ti(OR)_nX_{4-n}$, wherein each impregnation may or may not be carried out in the presence of an (impregnation) electron donor.

The invention also provides a process for preparing a catalyst.

The impregnation electron donors suitable for the preparation of supported catalysts are organic compounds comprising one or several oxygen, nitrogen, sulfur or phosphorus atoms. By way of example we can cite organic acids, organic acid esters, alcohols, ethers, aldehydes, ketons, amines, amine oxides, amides, thiols. The association of one or several of the above electron donors can be implemented. More specifically, the currently employed electron donors containing one or several oxygen atoms can be organic acid esters or ethers. More specifically, these can be mono- or dicarboxylic aromatic esters or diethers. Examples of aromatic esters are the dialkylphtalates wherein the alkyl group contains 1–20 carbon atoms, preferably 1 to 10 carbon atoms, such as di(n-butyl)phtalate, diisobutylphtalate, dioctylphtalate, diheptylphtalate, diethylphtalate. The following examples of diethers can be cited: 2,2-diisobutyl-1,3-dimethoxypropane, 2,2-diisobutyl-1,3-diethoxypropane, 2-isopropyl-2-isobutyl-1,3-dimethoxypropane, 2-isopropyl-2-cyclolhexyl-1,3-dimethoxypropane, 2-isopropyl-2-cyclopentyl-1,3-dimethoxypropane, 2,2-dicyclopentyl-1,3-dimethoxypropane, 9,9-bis(methoxymethyl)fluorene.

The amount of impregnation electron donor can vary. With advantage, it is comprised between 2 and 20% and preferably between 4 and 16% by weight of the catalytic component.

According to one embodiment, the amount of impregnation electron donor is less than 9% by weight of the catalytic component. According to this embodiment, the production of polyalphaolefin having a widened molecular weight distribution is favored.

According to another embodiment, the amount of impregnation electron donor is greater than 9% by weight of the catalytic compound. In this embodiment, a supported catalyst is obtained having very high productivity. Suitable inert solvent for the synthesis of Ziegler-Natta catalyst are the aliphatic hydrocarbons such as hexane, heptane or decane, alicyclic hydrocarbons such as cyclohexane or ethylcyclohexane, aromatic hydrocarbons such as toluene, xylene or chlorobenzene or any mixture of the above solvents.

The catalytic component thus prepared is associated with a co-catalytic system for providing olefin polymerization. This cocatalytic system is constituted by a cocatalyst and, optionally, an electron donor. The cocatalyst is generally chosen from group III metal alkyls. Among these products we can mention: the alkylaluminiums such as trimethylaluminium, triethylaluminium, trilsobutylaluminium and combinations thereof. The cocatalytic electron donor can be selected from the aliphatic or aromatic silanes of general formula $SiR_4$ wherein R can be an alkyl group containing 1 to 20 carbon atoms and/or an alkoxy, OR' group, R' being an alkyl group containing 1 to 20 carbon atoms. The cocatalytic electron donor can also be chosen from the family of silacycloalkanes. The cocatalytic electron donor can also be chosen from the family of diethers of general formula $R_1R_2C(CH_2OR_3)_2$, R1, R2 and R3 can be alkyl groups containing 1 to 20 carbon atoms. As cocatalytic electron donor, one for example will prefer dicyclopentyl dimethoxysilane, cyclohexylmetlhyldimethoxy-silane, diisobutyldimllethoxysilane.

The invention applies to polymerization of α-olefins and more particularly propylene, as well as copolymerization or terpolymerization of α-olefins. In the case of copolymerization, the other monomer can be ethylene or another monomer. When the comonomer is not an α-olefin, it makes up less than 50% by weight. The term α-olefin such as employed in this specification covers olefins comprising 3 to 20 carbon atoms, preferably 3 to 8 carbon atoms. The preferred α-olefin is propylene. In the case of copolymers of propylene, for example with ethylene or butene, the comonomer generally makes up less than 300% by weight. In addition to the stereospecific polymers which may be made using the catalyst of the invention, the catalyst also makes it possible to provide, with high productivity, non stereospecific polymers such as random copolymers of α-olefins having a high ratio of a comonomer such as ethylene.

The α-olefin polymerization can be done using known processes, in solution, in suspension, bulk or in the gas phase.

Preferably, the mean diameter of the catalyst according to the invention is comprised between 5 and 50 μm when used with a suspension process and between 20 and 150 µm when used with a gas phase process.

A chain transfer agent can be employed for controlling melt index of the polymer to be produced. The chain transfer agent can be hydrogen introduced in an amount of up to 90% and generally in the range 0.01 to 60 mole-% of the total olefin and hydrogen introduced in the reactor. This chain transfer agent makes it possible to obtain a given melt index, knowing that the melt index increases when the amount of chain transfer agent increases. The invention offers the advantage of causing little chain transfer agent to be consumed for a given melt index.

The invention also provides a process for α-olefin polymerization comprising the following steps:

(i) preparation of a support as described above;

(ii) activation of the support as described above;

(iii) preparation of a catalyst on the activated support of step (ii), as described above;

(iv) contacting an α-olefin charge with the catalyst under polymerization conditions.

The following examples are given by way of illustration of the invention not by way of limitation.

EXAMPLES

All handling is carried out under nitrogen atmosphere. HI is defined as the percentage of polymer insoluble in boiling heptane. The melt index is defined as in ASTM-D 1238.

Example 1

Synthesis of Support

In a glass 1 liter reaction vessel provided with a double jacket, mechanical stirring, a condenser and a pipe allowing reagent introduction, there were introduced 135 g of a solution comprising 20% by weight (0.24 mole) butylethylmagnesium (BEM) in heptane. 1.56 g diusoamylether (0.01 mole), 9.16 g (0.006 mole) of a tetraisobutyldialuminoxane (TiBAO) 20% by weight solution in heptane. This mixture was stirred for 1 hour at room temperature at 500 rpm. The temperature of the reaction mixture was then raised to 50° C.

Under the same conditions of stirring and at 50° C., using a syringe, a mixture consisting of 56.8 g (0.61 mole) tertiobutyl chloride and 2.34 g (0.015 mole) diisoamylether were introduced at a rate of 35 ml/h. Following introduction, stirring and temperature were kept at the preceding values for two hours. The suspension thus obtained was filtered then washed three times successively using 100 ml hexane on each occasion. The mixture was filtered after each washing.

The solid recovered was resuspended in 200 ml hexane, and the temperature was brought up to 40° C. with stirring (250 rpm). Under these conditions, using a syringe, 33.6 g (0.46 mole) tetrahydrofuranne (THF) were introduced at a rate of 60 ml/h. Following this addition, the mixture was kept at 40° C. with stirring for 15 minutes. The suspension was then filtered and the solid recovered, washed three times each time with 200 ml hexane. Filtration was performed after each washing. A solid was obtained.

Synthesis of Catalyst

This solid was suspended in 60 ml toluene at room temperature with stirring (250 rpm). 178 ml of TiCl4 were added. The temperature was raised in 10 minutes to 85° C. When the temperature reached 50° C., 3.42 g di-n-butylphtalate (DnBP) were added. The temperature was kept at 85° C. for two hours. After filtration, 123 ml toluene and 7 ml TiCl4 were added and stirring was performed for one hour at 85° C. This operation was repeated 4 times. After the last filtration, 200 ml hexane were added with stirring for 15 minutes at 70° C. Following filtration, the solid was dried for two hours at 70° C. 23.4 g of a catalyst C1 were obtained, containing 1.9% titanium, 13.9% magnesium and 8.3% DnBP. D50 was 11.4 microns for a span of 0.6.

Polymerization

In a 3.5 liter metal reaction vessel provided with a double jacket and mechanical stirring, previously put under inert atmosphere, one bar hydrogen and 2.4 liter propylene were introduced. Under stirring, 24 mMoles triethylaluminium, 1.2 mMoles dicyclopentyldimethoxy-silane and 15 mg Cl catalyst, were introduced at room temperature. Tile temperature was raised to 70° C. in ten minutes, then kept at this value for one hour. The residual propylene was then degassed and 605 grams of polypropylene were recovered, equivalent to 40500 g polypropyle/gram of catalyst Cl having a melt index of 7.0 gramme/10 minutes and an HI of 97.0%. D50=386; span=1.2; % fines=8.8 (percentage of particles having a diameter below 100 micron).

Example 2

Synthesis of Support

In a glass 1 liter reaction vessel provided with a double jacket, mechanical stirring, a condenser and a pipe allowing the introduction of reagents, 135 g of a solution constituted of 20% by weight butylethylmagnesium (BEM) in heptane, 1.56 g diisoamylether. 9.16 g, of a solution of tetraisobutyldialuminoxane (TiBAO) 20% by weight in heptane were introduced. This mixture was stirred for one hour at room temperature at 500 rpm. The temperature of the reaction mixture was then raised to 50° C.

Under the same conditions of stirring and at 50° C., using a syringe, a mixture consisting of 56.8 g tertiobutyl chloride and 2.34 g diisoamylether were introduced at a rate of 35 ml/h. After this introduction, stirring and temperature were kept at the previous values for 2 hours. The temperature was then brought to 40° C. and stirring decreased to 250 rpm. Using a syringe, 33.6 g tetrahydrofuranne (THF) were introduced at a rate of 60 ml/h. Following this addition, the mixture was kept at 40° C. with stirring for 15 minutes. The suspension was then filtered and the solid recovered was washed three times, using on each occasion 200 ml hexane. A filtration was performed after each washing. A solid was obtained.

Synthesis of Catalyst 20 g of this solid were suspended in 60 ml toluene at room temperature with stirring (250 rpm). 160 ml of TiCl4 were added. The temperature was raised over 10 minutes to 100° C. When the temperature reached 50° C., 3.06 g DnBP were added. The temperature was kept at 100° C. for 2 hours. After filtration, 123 ml toluene and 14ml TiCl4 were added and stirred at 100° C. for 1 h. This operation was repeated 4 times. After the last filtration, 200 ml hexane were added with stirring for 15 minutes at 70° C. This operation was repeated twice. After filtration, the solid was dried for 2 hours at 70° C. 11.3 g of a catalyst C2 were obtained containing 2.0% titanium, 19.2% magnesium and 8.8% DnBP. D50 was 10.4 microns for a span of 1.1.

Polymerization

In a 3.5 liter metal reaction vessel provided with a double jacket and mechanical stirring, previously put under inert atmosphere, one bar hydrogen and 2.4 liter propylene were introduced. With stirring, 24 mMoles trietlhylaluminium, 1.2 mMoles dicyclopentyldimiiethoxy-silane and 15 mg C2 catalyst were introduced at ambient temperature. The temperature was raised to 70° C. in ten minutes then kept at this value for one hour. The residual propylene was then degassed and 800 grams of polypropylene were recovered equivalent to 53300 g polypropylene/gram of catalyst C2 having a melt index of 2.9 gramme/10 minutes and an HI of 98.2%. D50=360 µM; span=1.0; % fines=10.

Example 3

Synthesis of Support

In a glass 2 liter reaction vessel provided with a double jacket, mechanical stirring and a pipe allowing the reagents to be introduced, 400 g butylethylmagnesium (BEM) at 20% in heptane, 4.6 g diisoamylether, 18.09 g of a solution of 20% by weight tetraisobutyldialuminoxane (TiBAO) in hexane were introduced.

This mixture was stirred for 1 hour at room temperature at 400 rpm, the reaction mixture temperature being then raised to 50° C.

Under the same conditions of stirring and at 50° C., using a syringe, a mixture constituted of 168.3 g tertiobutyl chloride and 46.05 g diusoamylether were introduced at a rate of 120 ml/h. After this introduction, the temperature was brought to 40° C. and stirring speed reduced to 250 rpm. Using a syringe, 99.6 g of THF were introduced at a rate of 120 ml/h. Following this addition, the mixture was kept at 40° C. with stirring for 15 minutes. The suspension was then filtered and the solid recovered, washed three times using 800 ml hexane on each occasion. A filtration was performed after each washing. A solid was obtained.

Synthesis of Catalyst 11.8 g of this solid were suspended in 31 ml toluene at room temperature with stirring (250 rpm). 94 ml of TiCl4 were added. The temperature was raised over 10 minutes to 100° C. When the temperature reached 50° C., 1.81 g DnBP were added. The temperature was kept at 100° C. for two hours. After filtration. 7.7 ml of TiCl4 and 146 ml toluene were added and stirring was performed for 1 hour at 250 rpm at 100° C. This operation was repeated three times. After the last filtration, 118 ml hexane were added and stirring at 250 rpm was performed for 15 minutes at 70° C. This operation was repeated twice. After filtration, the solid was dried for 2 hours at 70° C. 7.3 g of catalyst C3 were obtained, D50=31.2 µm, span=1.1.

Polymerization

In a 8 liter metal reaction vessel with a double jacket and mechanical stirring, previously put under inert atmosphere, 1 bar hydrogen and 6 liter propylene were introduced. With stirring, 30 mMoles triethylaluminium 1.5 mMoles dicyclopentyldimethoxy-silanie and 30 mg C3 catalyst were introduced at room temperature. The temperature was raised to 70° C. in ten minutes then kept at this value for one hour. With a temperature brought down to 25° C. the residual propylene was degassed and 1410 grams of polypropylene equivalent to 47000 g polypropyle per gram of catalyst C3 were recovered, having a melt index of 7.8 g/10 minutes. Dp50 =932 µm, span=1.0; % fines=2.3, HI=97.9.

Example 4

Synthesis of Support

In a glass 1 liter reaction vessel provided with a double jacket, mechanical stirring and a pipe allowing the reagents to be introduced, 200 g of butylethylmagnesium (BEM) at 20% in heptane, 2.5 g diusoamylether, 9.05 g of a solution of 20% by weight tetraisobutyldialuminoxane (TiBAO) in hexane were introduced.

This mixture was stirred for 1 hour at room temperature at 400 rpm, the temperature of the reaction mixture then being raised to 50° C.

Under the same conditions of stirring and at 50° C., using a syringe, a mixture constituted of 84.4 g tertiobutyl chloride and 23.3 g diisoamylether were introduced at a rate of 60 ml/h. After this introduction, the temperature was brought down to 40° C. and stirring speed reduced to 250 rpm. Using a syringe, 50.9 g of THF were introduced at a rate of 60 ml/h. After this addition, the mixture was kept at 40° C. under stirring for 15 minutes. The suspension was then filtered and a solid recovered, washed three times using 200 ml hexane on each occasion. Filtration was carried out after each washing. A solid was obtained.

Synthesis of Catalyst 12.8 g of this solid were suspended in 34 ml of toluene at room temperature with stirring (250 rpm). 102 ml of TiCl4 are added. The temperature was raised to 100° C. in ten minutes. When the temperature reached 50° C., 1.96 of DnBP were added. Tile temperature was kept at 100° C. for two hours. After filtration, 8 ml of TiCl4 and 158 ml of toluene were added with stirring for 1 hour at 250 rpm at 100° C. This operation was repeated three times. After the last filtration, 128 ml of hexane were added with stirring at 250 rpm for 15 minutes at 70° C. This operation was repeated twice. After filtration, the solid was dried for 2 hours at 70° C. 6.7 g of catalyst C4 were obtained D50=19.7 µm, span=1.4. This catalyst contained 1.9% titanium, 18.9% magnesium and 9.8% DnBP.

Polymerization

In a 8 liter metal reaction vessel with a double jacket and mechanical stirring, previously put under inert atmosphere, 0.3 bar hydrogen and 6 liter propylene were introduced. With stirring, 30 mMoles triethylaluminium, 1.5 mMoles dicyclopentyldimethoxy-silanie and 30 mg C3 catalyst were introduced at ambient temperature. The temperature was raised to 70° C. in 10 minutes then kept at this value for 1 hour. With temperature brought back to 25° C., the residual propylene was degassed and 131 1 grams of polypropylene equivalent to 44700 grams polypropylene per gram of catalyst C4 were recovered, having a melt index of 2 g/10 minutes. D50=804 µm; span=1.2; % fines=6.2. Mw/Mn=6.8 (Mw/Mn: polymolecularity or polydispersity index. the ratio of molecular mass in weight to molecular mass in number).

Example 5

Synthesis of Support

The procedure was identical to that in example 4.

Synthesis of Catalyst

The procedure was identical to that in example 4, except that the 1.9 g of DnBP was replaced by 0.65 g DnBP. 6.6 g of catalyst C5 are now obtained. D50=20.4 µm, span=1.3. This catalyst contained 2.6% titanium, 19% magnesium and 5.4% DnBP.

Polymerization

Polymerization was performed as in example 4 but 0.35 bar of hydrogen were introduced instead of 0.3 bar. 1218 g of polymer were recovered equivalent to 40600 g polypropylene per gram of catalyst C5 having a melt index of 10 g/10 min. Dp50=684 μm, span=1.2; fines=3%, Mw/Mn= 16.1

Example 6

Synthesis of Support

The procedure was identical to that in example 4.

Synthesis of Catalyst 13.1 g of this solid were suspended in 35 ml of toluene at room temperature with stirring (250 rpm). 105 ml of TiCl4 were added. The temperature was raised over 10 minutes to 100° C. When the temperature reached 50° C. 32.8 g of DnBP were added. The temperature was kept at 100° C. for 2 hours. After filtration, 8.5 ml of TiCl4 and 162 ml of toluene were added with stirring at 250 rpm at 100° C. for 1 hour. This operation was repeated three times. After the last filtration, 131 ml hexane was added followed by stirring at 250 rpm for 15 minutes at 70° C. This operation was repeated twice. After filtration, the solid was dried for 2 hours at 70° C. 6.9 g of catalyst C6 were obtained, D50=20.9 μm; span=1.4.

This catalyst contained 1.7% titanium, 18.5% magnesium and 12.8% DnBP.

Polymerization

Polymerization was performed as in example 4 except that 0.35 bars of hydrogen were introduced instead of 0.3 bars. 1 863 g of polypropylene were recovered equivalent to 62100 g propylene per gram of catalyst C6 having a melt index of 4.8 g/10 minutes. Dp50=805 μm; span=1.2; fines= 4.9%.

Comparative Example

Synthesis of Support

In a 1 liter glass reaction vessel provided with a double jacket, mechanical stirring and a condenser and pipe allowing reagents to be introduced, 135 g of a solution constituted by 20% by weight (0.24 mole) butylethylmagnesium (BEM) in heptane, 1.56 g diusoamylether (0.01 mole), 9.16 g (0.006 mole) of a solution of 20% by weight tetraisobutyldialuminoxane (TiBAO) in heptane were introduced. This mixture was stirred for 1 hour at room temperature at 500 rpm. The temperature of the reaction mixture was then raised to 50° C.

Under the same stirring conditions and at 50° C., using a syringe, a mixture constituted of 56.8 g (0.61 mole) tertiobutyl chloride and 2.34 g (0.015 mole) diisoamylether were introduced at a rate of 35 ml/h. After this introduction, stirring and temperature were kept at the preceding values for 2 hours. The suspension thus obtained was filtered and washed three times successively using 100 ml hexane on each occasion. The medium was filtered after each washing.

The solid thus obtained was suspended in 150 ml toluene. The temperature was brought up to 110° C. and maintained at this value for two hours. After filtration, the operation was repeated. After the last filtration, the solid was suspended in 100 ml heptane and maintained at 100° C. for 30 minutes, then filtered. This operation was repeated three times. The solid was dried at 70° C. for 1 hour. A solid was obtained.

Synthesis of Catalyst 5 g of this solid were suspended in 31.5 ml of toluene at ambient temperature with stirring (250 rpm). 94.6 ml of TiCl4 were added. The temperature was raised over 10 minutes to 90° C. When the temperature reached 50° C., 1.75 ml of DnBP were added. The temperature was maintained at 90° C. for 2 hours. After filtration, 30 ml of TiCl4 and 270 ml of toluene were added with stirring at 100° C. for 1 hour. This operation was repeated 4 times. After the last filtration, 100 ml hexane were added with stirring for 15 minutes at 70° C. This operation was repeated twice. After filtration, the solid was dried for 30 minutes at 70° C. A catalyst C7 was obtained containing 0.28 titanium, 23.7% magnesium. D50 was 33.2 μm for a span of 1.3.

Polymerization

In a 3.5 liter metal reaction vessel with a double jacket and mechanical stirring, previously put under inert atmosphere. 0.35 bar hydrogen and 2.4 liter propylene were introduced. With stirring. 24 mMole triethylaluminium. 2.4 mMole dicyclopentyldimethoxysilane and 30 mg C7 catalyst were introduced at ambient temperature. The temperature was raised to 70° C. in ten minutes then kept to this value for 1 hour. The residual propylene was then degassed and 69 grams of polypropylene equivalent to 2300 g polypropylene/ gram of catalyst C7 were recovered.

The invention is not limited to the embodiments described but may be subject to numerous variations readily accessible to those skilled in the art.

Although the invention has been described in conjunction with specific embodiments, it is evident that many alternatives and variations will be apparent to those skilled in the art in light of the foregoing description. Accordingly, the invention is intended to embrace all of the alteniatives and variations that fall within the spirit and scope of the appended claims. The above references are hereby incorporated by reference.

What is claimed is:

1. A process for preparing a catalyst support for polymerizing α-olefins comprising:
   (i) reacting, in the presence of a first electron donor, a chlorine-containing organic compound and a prior mixture of an alkylmagnesium and an aluminoxane and/or aluminosiloxane and/or alkylaluminum and, optionally a second electron donor, to form a reaction product;
   (ii) suspending the reaction product from step (i) in an inert liquid to form a suspension; and
   (iii) activating the reaction product from step (i) by adding an activation electron donor to said suspension of the reaction product.

2. The process according to claim 1, wherein the chlorine-containing organic compound is mixed with at least a portion of the first electron donor prior to the reaction of step (i).

3. The process according to claim 1, wherein the amount of first electron donor mixed with the chlorine-containing organic compound prior to the reaction of step (i) represents, in moles, more than 50% of the total of the first and second electron donors present during the reaction of step (i).

4. The process according to claim 1, wherein the reaction of step (i) takes place in the presence of a first electron donor, the prior mixture of an alkylmagnesium and an aluminoxane and/or aluminosiloxane and/or alkylaluminum comprising a second electron donor, identical to the first electron donor.

5. The process according to claim 1, wherein the first and second electron donors are aliphatic or cyclic ethers.

6. The process according to claim 5, wherein the first and second donors are selected from diisoamylether or sec-butylether.

7. The process according to claim 1, wherein the aluminosiloxane and/or alkylaluminum and the alkylmagnesium are employed in a molar ratio Mg/Al between 5 and 200.

8. The process according to claim 1, wherein the concentration of chlorine-containing organic compound is such that the molar ratio Cl/Mg is greater than 2.

9. The process according to claim 1, wherein the amount of second electron donor employed with the derivative of alkylmagnesium and the aluminoxane and/or the aluminosiloxanie and/or alkylaluminum is such that the molar ratio of this electron donor to magnesium is between 0.01 and 5.

10. The process according to claim 1, wherein the amount of the first electron donor employed with the chlorine-containing organic compound is such that the molar ratio thereof to magnesium is between 0.01 and 5.

11. The process according to claim 1, wherein the chlorine-containing compound is a primary, secondary or tertiary alkyl chloride.

12. The process according to claim 1, wherein the activation electron donor is a cyclic monoether.

13. The process according to claim 12, wherein the cyclic monoether is tetralhydrofurane, tetrahydropyrane, 2-methyl-tetrahydrofurane, 3-methyl-tetrahydrofurane.

14. The process according to claim 13, wherein the cyclic monoether is tetrahydrofurane.

15. The process according to claim 1, wherein the activation electron donor molar ratio to magnesium initially introduced is in between 0.1 and 3.

16. The process according to claim 1, wherein the volume ratio of inert liquid to activation electron donor is between 1 and 20.

17. The process according to claim 1, wherein the activation step is carried out at a temperature between 20° C. and (Teb+20° C.), Teb being the boiling point temperature of the activation electron donor.

18. The process according to claim 17, wherein the activation step is carried out at a temperature between 20° C. and (Teb−10° C.).

19. The process according to claim 5, wherein the ether is an aliphatic ether.

20. The process according to claim 7, wherein the molar ratio is between 10 and 80.

21. The process according to claim 8, wherein the molar ratio is between 2 and 4.

22. A process for preparing a catalyst support for polymerizing α-olefins comprising:

(i) reacting, in the presence of diisoamylether, tert.butylchloride and a prior mixture of butylethiylmagnesium (BEM) tetraisobutyldialuminoxane (TiBAO) and diisoamylether the molar ratio of Mg/Al being comprised between 10 and 80, the molar ratio of Cl/Mg being comprised between 2 and if the molar ratio of diisoamylether introduced with BEM and TiBAO being a between 0.01 and 5 and the molar ratio of diusoamylether introduced with tert.butylchloride being between 0.01 and 5; and (ii) activating the product from step (i) in suspension in an inert liquid by tetrahydrofuranie, the molar ratio of tetrahydrofurane to the initially introduced magnesium being between 0.1 and 3 and the volume ratio of inert liquid and tetrahidrofilrane being between 1 and 20.

* * * * *